United States Patent
Rihtaric

(10) Patent No.: US 11,484,940 B2
(45) Date of Patent: Nov. 1, 2022

(54) METHOD FOR CASTING A MELT OF A METAL MATERIAL, AND CASTING DEVICE DESIGNED FOR CARRYING OUT THE METHOD

(71) Applicant: Fill Gesellschaft m.b.H., Gurten (AT)

(72) Inventor: Silvo Rihtaric, Ptuj (SI)

(73) Assignee: Fill Gesellschaft M.B.H., Gurten (AT)

( * ) Notice: Subject to any disclaimer, the term of this patent is extended or adjusted under 35 U.S.C. 154(b) by 75 days.

(21) Appl. No.: 17/049,020

(22) PCT Filed: Apr. 18, 2019

(86) PCT No.: PCT/AT2019/060134
§ 371 (c)(1),
(2) Date: Oct. 19, 2020

(87) PCT Pub. No.: WO2019/204845
PCT Pub. Date: Oct. 31, 2019

(65) Prior Publication Data
US 2021/0237150 A1      Aug. 5, 2021

(30) Foreign Application Priority Data
Apr. 27, 2018  (AT) .............................. A 50358/2018

(51) Int. Cl.
*B22D 18/04*   (2006.01)
*B22D 18/02*   (2006.01)
*B22D 11/00*   (2006.01)
*B22D 21/00*   (2006.01)
*H02K 44/06*   (2006.01)

(52) U.S. Cl.
CPC ............. *B22D 18/04* (2013.01); *B22D 18/02* (2013.01); *B22D 11/003* (2013.01); *B22D 21/007* (2013.01); *H02K 44/06* (2013.01)

(58) Field of Classification Search
CPC ...... B22D 18/02; B22D 18/04; B22D 21/007; B22D 27/02; B22D 39/00; B22D 39/003
See application file for complete search history.

(56) References Cited

U.S. PATENT DOCUMENTS

| | | | |
|---|---|---|---|
| 6,581,673 B1* | 6/2003 | McKibben | B22D 18/04 164/133 |
| 2015/0336170 A1 | 11/2015 | Wagstaff et al. | |

FOREIGN PATENT DOCUMENTS

| | | |
|---|---|---|
| CN | 2476374 Y | 2/2002 |
| CN | 203887176 U | 10/2014 |
| CN | 104550798 A | 4/2015 |
| DE | 102008011008 A1 | 9/2009 |

(Continued)

*Primary Examiner* — Kevin P Kerns
*Assistant Examiner* — Steven S Ha
(74) *Attorney, Agent, or Firm* — Stoel Rives LLP

(57) ABSTRACT

The invention relates to a method and a device for casting a melt 4 of a metallic material by means of a furnace 2 of a low pressure casting device, which furnace 2 has a receiving space 3 and a riser tube protruding into said receiving space 3. By pressurizing the receiving space 3 with compressed air, the melt 4 in the riser tube 12 of the furnace 2 is pressed into a mold cavity 10 of a mold 7, wherein simultaneously, a magnetic field acting against the conveying direction 23 of the melt 4 is applied to the melt 4 of the metallic material by means of a magnetic element 16 arranged in the region of the riser tube 12.

20 Claims, 7 Drawing Sheets

(56) References Cited

FOREIGN PATENT DOCUMENTS

Figure 1:
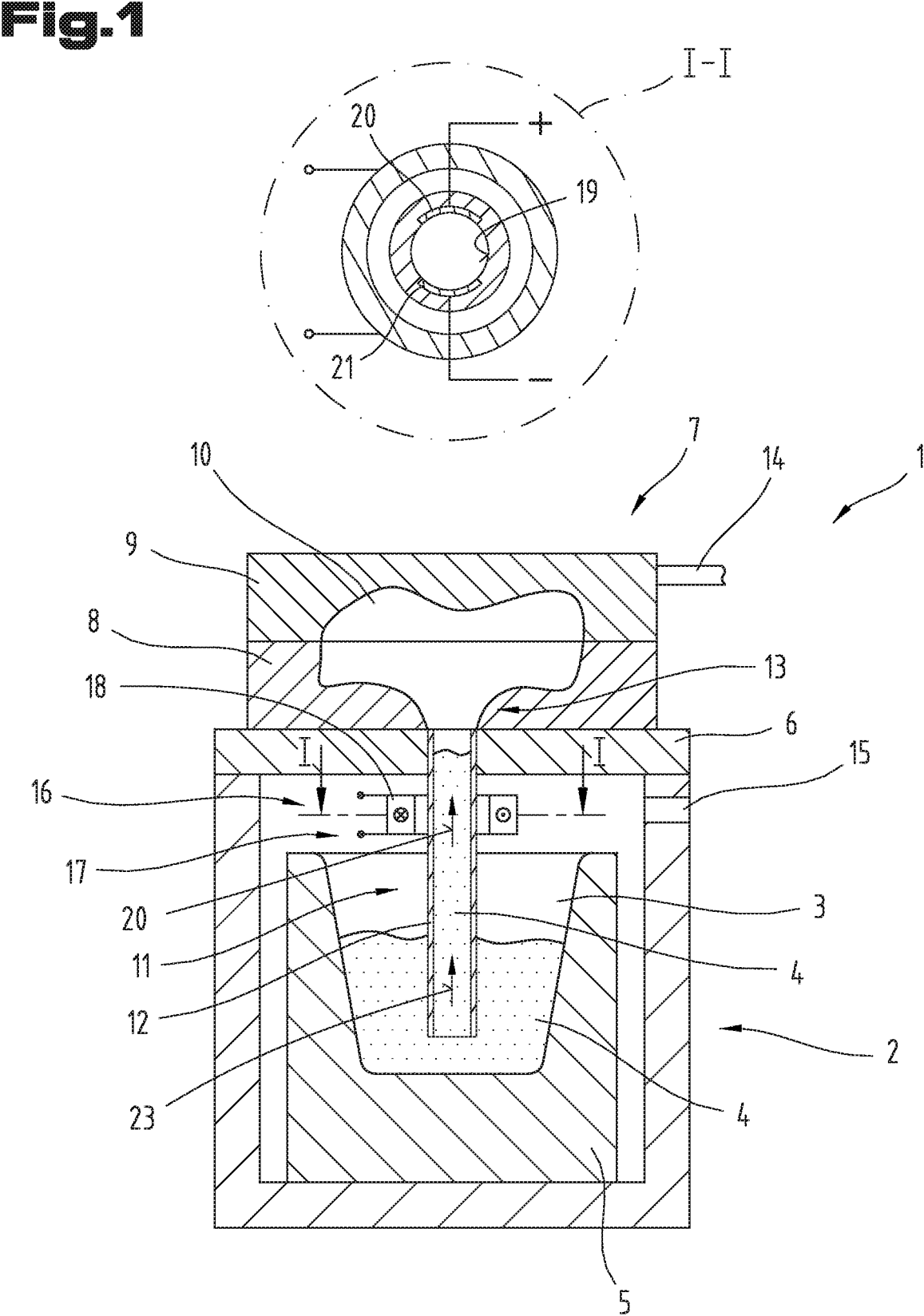

| | | | |
|---|---|---|---|
| EP | 1097013 | B1 | 9/2002 |
| EP | 2708839 | A1 | 3/2014 |
| JP | H0577018 | A | 3/1993 |
| JP | H05318084 | A | 12/1993 |
| JP | H10109152 | A | 4/1998 |
| JP | 2016078064 | A | 5/2016 |
| JP | 6317658 | B2 | 4/2018 |
| WO | 2016093328 | A1 | 6/2016 |

* cited by examiner

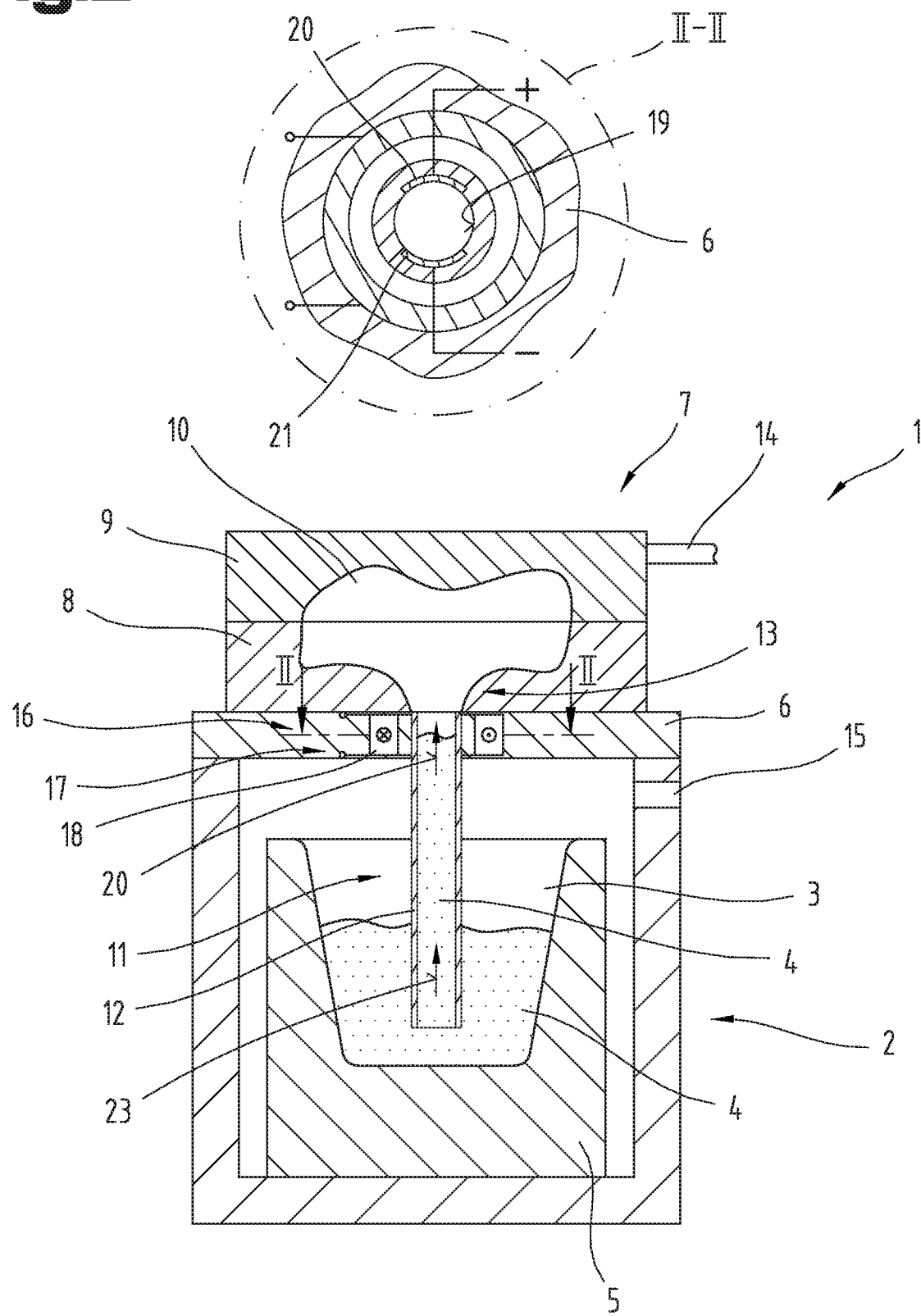

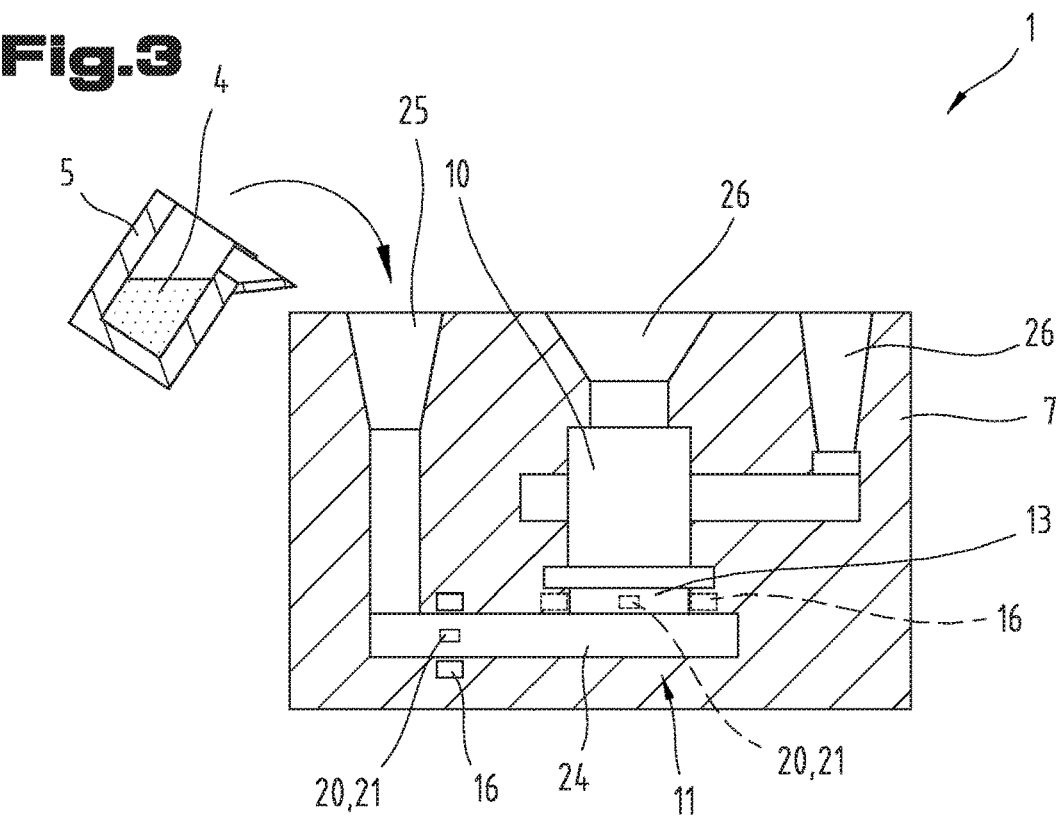
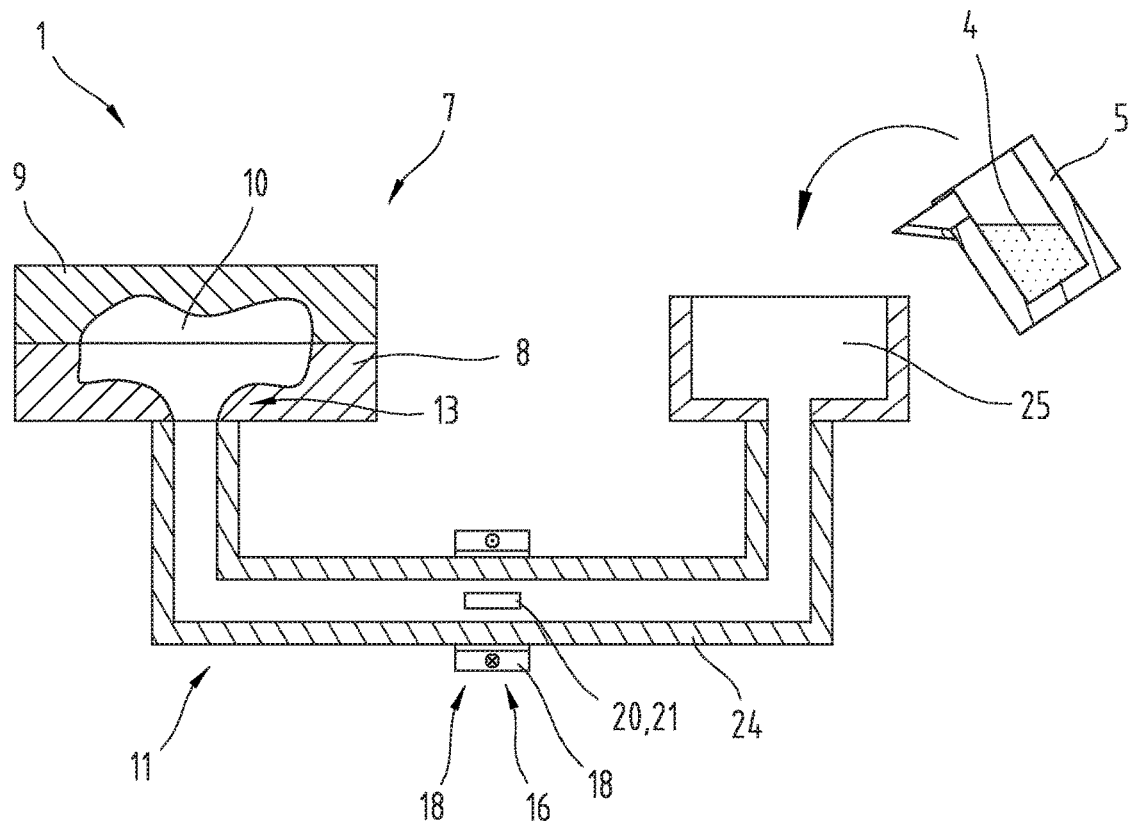

METHOD FOR CASTING A MELT OF A METAL MATERIAL, AND CASTING DEVICE DESIGNED FOR CARRYING OUT THE METHOD

RELATED APPLICATIONS

This application is a national stage under 35 U.S.C. § 371 of International Application No. PCT/AT2019/060134, filed Apr. 18, 2019, which claims priority of Austrian Patent Application No. A50358/2018, filed Apr. 27, 2018.

The invention relates to a method for casting a melt of a metallic material and a casting device designed for executing the method.

From EP1097013B1, an electromagnetic pump for conveying a melt between a furnace and a mold is known.

The structure of EP1097013B1 has the disadvantage that, especially when working with para-magnetic materials such as aluminum, the electromagnetic pump exhibits a poor efficacy.

It was the object of the present invention to overcome the disadvantages of the prior art and to provide a method and a device by means of which paramagnetic materials can also be conveyed.

This object is achieved by means of a method and a device according to the claims.

According to the invention, a method for casting a melt of a metallic material by means of a furnace of a low pressure casting device or counter pressure casting device is provided. At that, it is provided that, by pressurizing the receiving space with compressed air, the melt in the riser tube of the furnace is pressed into a mold cavity of a mold, wherein simultaneously, a magnetic field acting against the conveying direction of the melt is applied to the melt of the metallic material by means of a magnetic element arranged in the region of the riser tube. The furnace is, in particular, a low pressure furnace.

The method according to the invention has the advantage that the melt, which is pressed through the riser tube into the mold cavity, can simultaneously be decelerated by means of the magnetic field of the magnetic element. It is therefore possible to influence the flow speed of the melt. In particular, the melt can be homogenized by the deceleration effect. Moreover, the method according to the invention can achieve that, when individual workpieces are cast successively with just one filling of the furnace, the filling speed for the individual workpieces can be controlled in such a way that the speed progression of the filling speed is the same for all workpieces.

Moreover, it is also conceivable that the pressure in the receiving space of the furnace is controlled in accordance with a predetermined pressure increase curve, and that the flow speed of the melt is controlled by means of the magnetic element.

It can also be provided that the magnetic element is arranged in the region of the riser tube with the smallest cross-sectional area that is flown through. The highest flow speed occurs in this region with the smallest cross-sectional area that is flown through. Tests have shown that in that exact region with the highest flow speed, the best effect of the magnetic field on the melt can be achieved.

Moreover, it can be provided that the melt of the metallic material is subjected to current by means of a first electrode and a second electrode, which contact the metallic material, and simultaneously a magnetic field acts on the region of the melt that is subjected to the current.

The electrodes have the surprising advantage that the effect of a magnetic force on the melt is increased when current is directed into the melt by means of the electrodes and, as a consequence, particularly an electric field is created in the melt. This surprising result could be observed particularly with aluminum. In particular, it is conceivable, that by means of the impact of the magnetic force, the melt is pushed in a direction that can be predetermined, in order to influence a flow of the melt. A further surprising advantage that was observed was, that a melt subjected to a magnetic field and/or a current in such a way forms a solid body with an improved structure after it has solidified. By means of these measures, defects in the structure of the solid body can be reduced, whereby the strength of the solid body and/or the susceptibility to errors of the solid body can be reduced.

Moreover, it can be useful if the magnetic field is created by means of an electromagnet. This entails the advantage that the magnetic field can be applied and/or removed selectively. In addition, the effective direction of the magnetic field can be influenced by means of an electromagnet. Furthermore, it is conceivable that the field strength of the magnetic field, and therefore the deceleration effect on the melt in the riser tube, can be influenced by varying the energization of the electromagnet.

As an alternative to this, it can be provided that the magnetic field is created by means of a permanent magnet. Such a permanent magnet can, as an example, be formed in the form of a neodymium magnet.

Moreover, it can be provided that the electromagnet is subjected to direct current.

As an alternative to this, it can be provided that the electromagnet is subjected to alternating current.

In addition, it can be provided that the melt is subjected to direct current by means of the electrodes.

As an alternative to this, it can be provided that the melt is subjected to alternating current by means of the electrodes.

In a particular embodiment variant, it can be provided that the electrodes and the electromagnet are subjected to alternating current, wherein the alternating current applied to the electrodes and the alternating current applied to the electromagnet are phase-shifted relative to one another or can be actively phase-shifted such that a magnetic force acts on the melt in the desired direction.

Furthermore, it can be provided that the metallic material comprises aluminum or an aluminum alloy. Seeing as aluminum is paramagnetic, with this material, in particular, a surprisingly good magnetic effect due to additional application of current onto the melt can be noted. Thereby, the force action of the magnetic field acting on the melt by means of the magnet can be increased.

Furthermore, it can be provided that the melt is transported into a mold cavity in a flow connection element, wherein the magnetic field is oriented such that, in the region of the flow connection element, a magnetic force acts on the melt. By this measure, the magnetic force can be made to act on the melt in the flow connection element, whereby the melt can be conveyed, for instance by means of the magnetic force and/or the conveyance effect can be supported by means of the magnetic force. Moreover, it is also conceivable that the magnetic force is oriented such that it decelerates the conveyance flow of the melt and/or counteracts it. Here, the magnetic field can serve, for example, for stopping or decelerating the flow of the melt, for example, to reduce turbulences and air pockets in the melt.

As an alternative or addition to this, it can be provided that the magnetic field is oriented such that, in the region of the gate, a magnetic force acts on the melt. By this measure, the magnetic force can be made to act on the melt in the gate, whereby the melt can be conveyed, for instance by means of the magnetic force and/or the conveyance effect can be supported by means of the magnetic force. Moreover, it is also conceivable that the magnetic force is oriented such that it decelerates the conveyance flow of the melt and/or counteracts it. Here, the magnetic field can serve, for example, for stopping or decelerating the flow of the melt, for example, to reduce turbulences and air pockets in the melt.

Moreover, it can be provided that a first electrode and a second electrode are arranged in the riser tube on two opposing sides of the cross-section.

In particular, it can be provided that the first electrode and the second electrode are shorted with one another by means of a current bridge. By this measure, the induction effect in the melt can be improved, whereby the magnetic force effect on the melt can be improved, as well. This can be achieved because the electric circuit does not have to be closed via the melt but rather because the electric circuit can be closed via the current bridge.

Moreover, it can be provided that the current bridge is formed of a material which has a higher electric conductivity than the material of the melt. By this measure, it can be achieved that the induced short circuit currents can form a circuit via the current bridge and therefore the induction effect in the melt can be improved.

Moreover, it is also conceivable that the magnetic field in the magnetic element and/or the currents in the first electrode and the second electrode is/are applied in a pulsed manner. Here it is particularly conceivable that the currents in the coil of the magnetic element are applied in a pulsed manner for creating the magnetic field. Moreover, it is also conceivable that the electrodes connected to a power source are subjected to a pulsed current.

In a further embodiment variant, it is also conceivable, that a power storage device, such as a capacitor, is formed, which is arranged in the region of the current bridge between the shorted electrodes and is charged via the short circuit current induced into the melt. The charge can then be given off in a pulsed manner.

The pulsed application of the magnetic field or of the currents causes a pulsed magnetic force effect on the melt. This entails the surprising advantage that multiple nuclei of crystallization are created simultaneously, whereby a homogeneous structure can be achieved in the solidified workpiece. In particular, these measures allow to achieve a grain refinement and with that, a strength increase.

Moreover, it can be provided that, by means of the first electrode and the second electrode in the riser tube, an induction voltage occurring in the melt and/or an occurring induction current is/are measured, wherein, based on the measured induction voltage and/or induction current, the flow speed of the melt is calculated. Thus, the arrangement according to the invention also allows to simultaneously determine the flow parameters of the melt.

In particular, it is conceivable that the pressurization in the receiving space of the furnace is controlled based on the measured induction voltage and/or based on the measured induction current and therefore based on the determined flow speed of the melt. Thus, a desired inflow behavior of the melt into the mold cavity of a mold can be achieved. In particular, the flow speed can therefore be directly influenced, and thus, be precisely controlled, by the pressurization. Furthermore, it is conceivable that, in addition to the improved pressurization, the field strength of the magnetic element is varied for controlling the flow speed.

According to the invention, a casting device for casting a melt of a metallic material is provided, wherein the casting device comprises a furnace of a low pressure casting device, which furnace is formed to be pressurized with compressed air, wherein the furnace has a riser tube for transferring the melt into a mold cavity of a mold. A magnetic element is arranged in the region of the riser tube, which magnetic element is formed to apply, against the conveying direction of the melt, a magnetic field acting on the melt.

Moreover, a casting device for casting a melt of a metallic material can be provided, wherein the casting device can have a flow connection element for directing the melt. On the flow connection element, a first electrode and a second electrode are arranged such that they can contact the melt. Moreover, a magnetic element is arranged on the flow connection element, which magnetic element is formed for applying a magnetic field to the region of the melt that is subjected to current.

The casting device according to the invention entails the advantage that the quality of the casting process can be improved therewith.

Moreover, it can be useful if the magnetic element is formed as an electromagnet, which has a coil that, at least in some regions, surrounds the flow connection element. In particular, a coil arranged around the flow connection element can apply a sufficient magnetic force to the melt.

Furthermore, it can be provided that the flow connection element is formed as a closed tube. The tube can have a circular or a rectangular cross-section.

Moreover, it can be provided that multiple mold cavities are formed in a mold, which mold cavities are each coupled with a runner via a gate, wherein a magnetic element is arranged in one or multiple ones of the gates. It is particularly advantageous if each of the gates has a magnetic element. Thereby, the inflow of the melt into the individual mold cavities can be selectively accelerated and/or decelerated. This measure makes possible that the individual mold cavities, which are positioned at different distances from a central runner, are filled evenly and simultaneously with melt, so that the melt introduced into the individual mold cavities can solidify simultaneously.

According to a particular embodiment, it is possible that the flow connection element has a rectangular cross-section, wherein the first electrode and the second electrode are arranged on two opposing sides of the cross-section. On flow connection elements having a rectangular cross-section, in particular, the electrodes can be easily arranged on opposing surfaces and/or sides of the cross-section.

Moreover, it can be provided that the flow connection element opens into a gate on the bottom side of the mold cavity.

Additionally, it is conceivable that the casting device is formed as a low pressure casting device or as a counter pressure casting device, wherein the flow connection element is formed as a riser tube. Here, it is particularly conceivable that the magnetic element is arranged in the region of a platen. The platen is formed between the furnace and the mold.

Alternatively to this, it can be provided that the casting device is formed as a continuous casting device, wherein the magnetic element is arranged in the region of the ingot mold or in the region of the casting tube.

Moreover, it can be provided that multiple mold cavities are formed in a mold, which mold cavities are each coupled with a runner via a gate. Here, it can be provided that magnetic elements are arranged in one or multiple ones of the gates.

Moreover, it can be provided that the coil is formed such that the flow cross-section of the flow connection element is annularly enclosed.

Moreover, it can be provided that the first electrode and the second electrode and the magnets are arranged relative to one another such that the electric flow generated by the electrodes is arranged at a right angle to the magnetic field.

Moreover, it can be provided that the electrodes are formed as copper electrodes.

Moreover, it can be provided that the electrodes are formed of a carbon. This entails the advantage that impurities are lower and, moreover, the resistance can be reduced.

Moreover, it can be provided that the electrodes are arranged diametrically opposed to one another with respect to the flow cross-section.

Moreover, it can be provided that the furnace has at least two riser tubes for transferring the melt into a mold cavity of a common mold, or of one mold each assigned to the respective riser tube. Therefore, in the first exemplary embodiment, multiple riser tubes open into different locations of a common mold. In the second exemplary embodiment, the riser tubes each open into different molds.

In particular, it can be provided that each of the at least two riser tubes has its own magnetic element. Thus, the flow of the melt in the two riser tubes can be influenced discretely and independently of one another by means of the respectively assigned magnetic element. This entails the advantage that, when an internal pressure in the furnace is the same, different flow behaviors can be achieved in the two riser tubes.

For the purpose of better understanding of the invention, it will be elucidated in more detail by means of the figures below.

Figure 5:
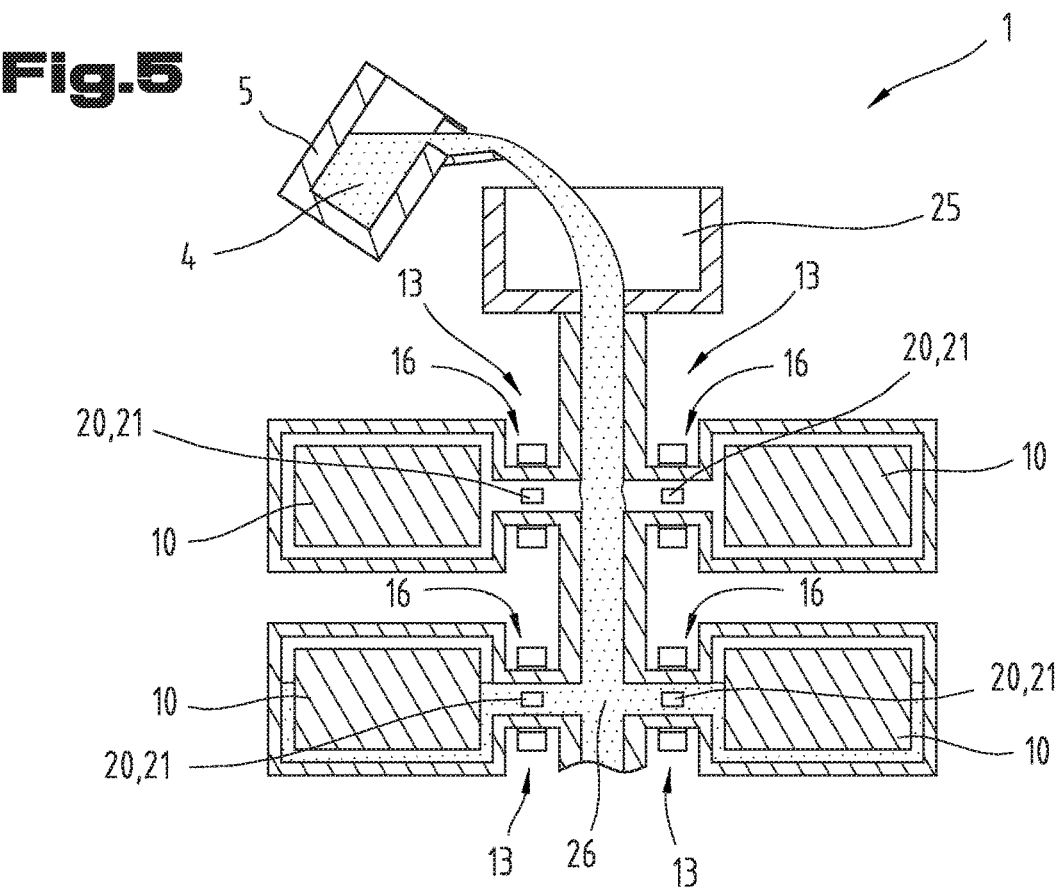
Figure 6:
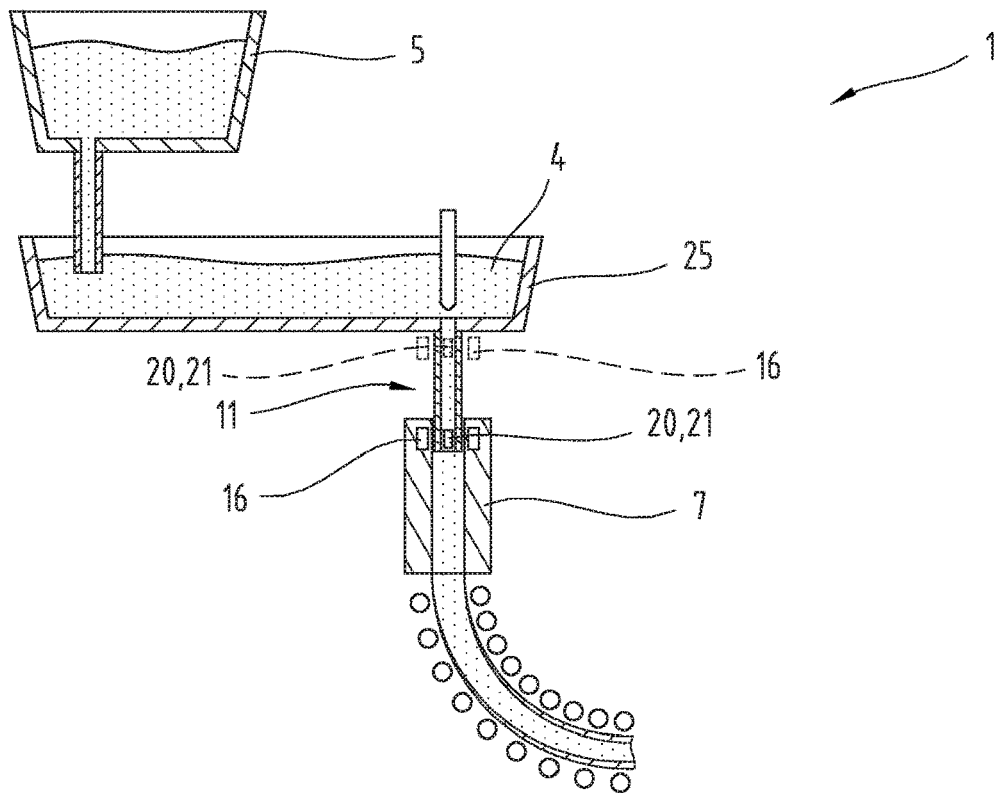
Figure 7:
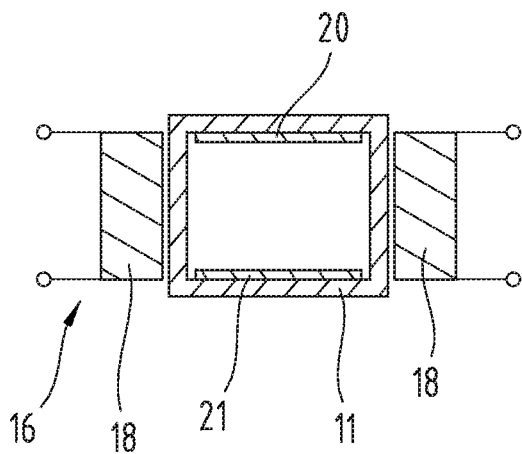
Figure 8:
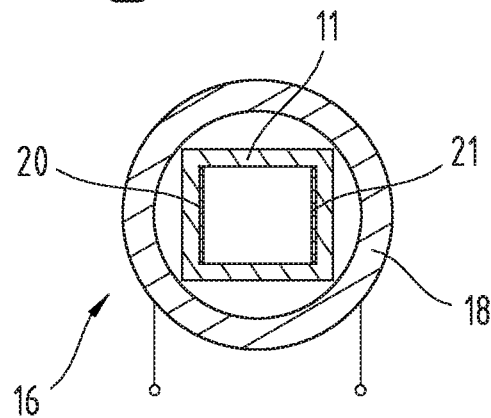
Figure 9:
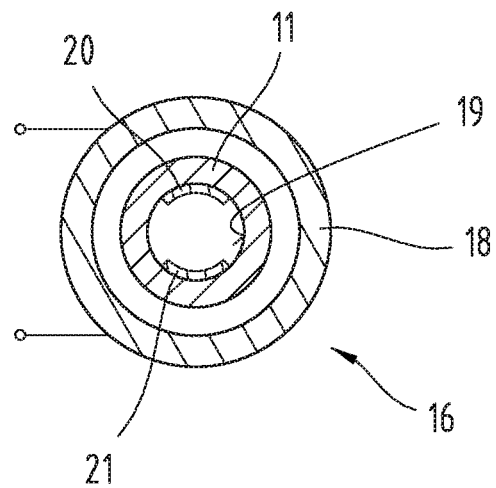
Figure 10:
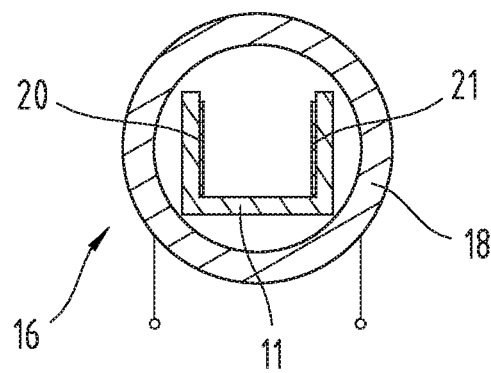
Figure 11:
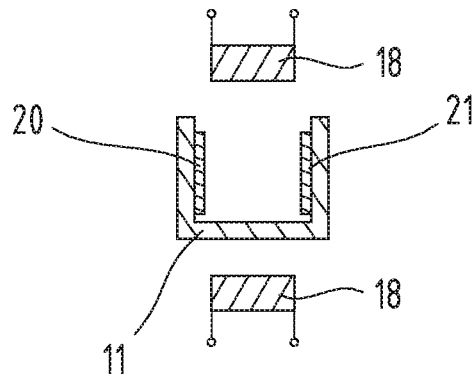
Figure 12:
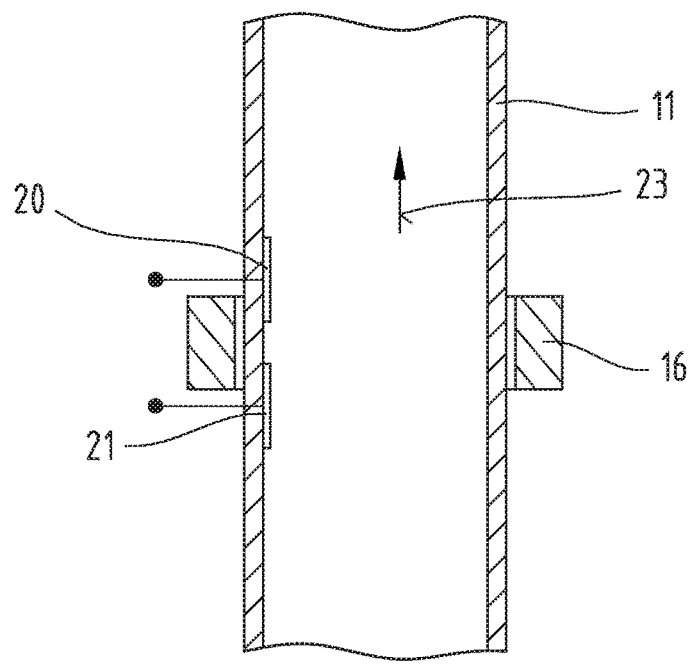
Figure 13:
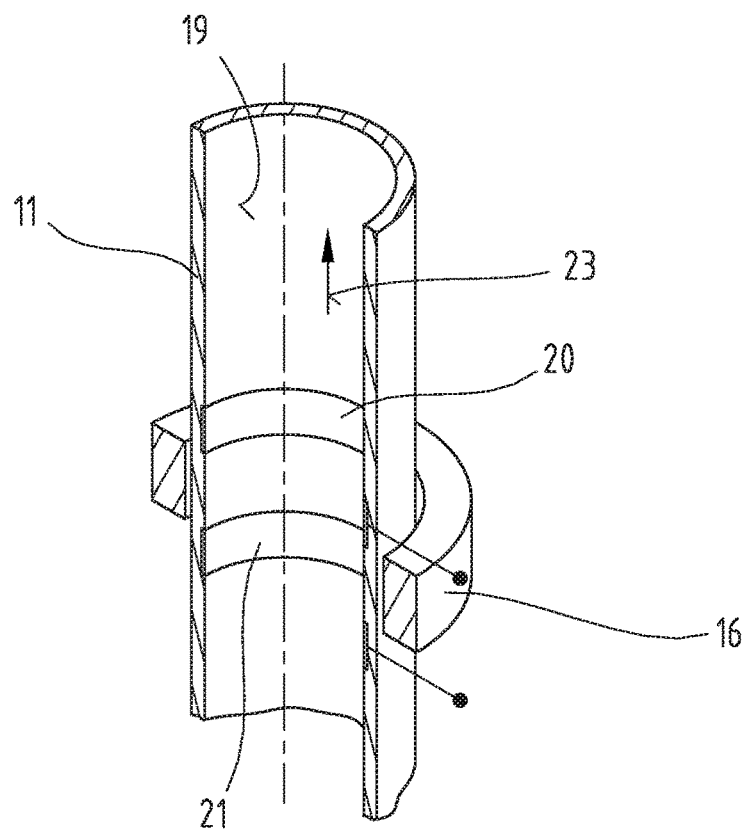
Figure 14:
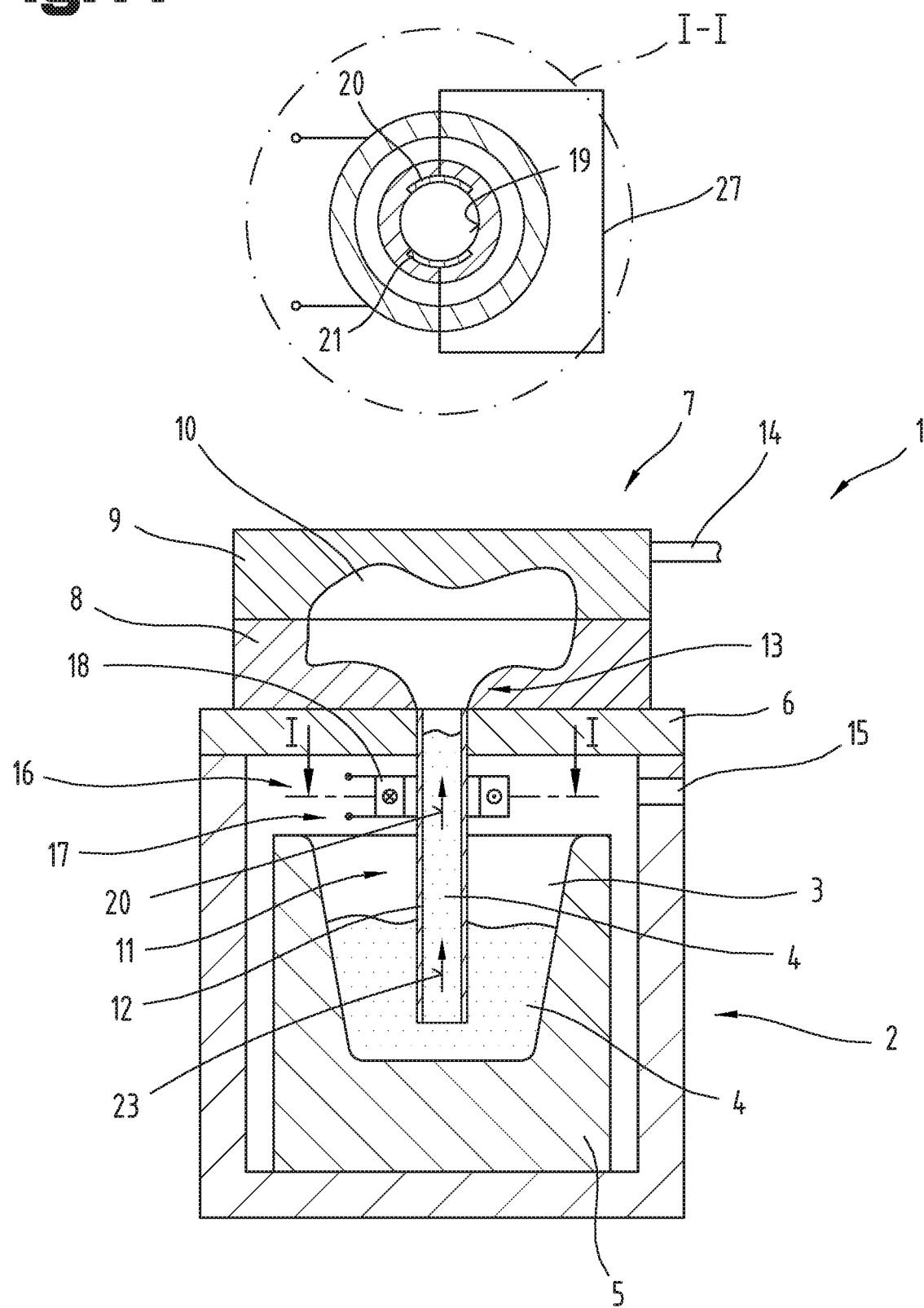

These show in a respectively very simplified schematic representation:

FIG. 1 a first exemplary embodiment of a casting device in the form of a low pressure ingot mold device or counter pressure ingot mold device;

FIG. 2 a further exemplary embodiment of a casting device in the form of a low pressure ingot mold device or counter pressure ingot mold device;

FIG. 3 a first exemplary embodiment of a gravity casting device;

FIG. 4 a further exemplary embodiment of a gravity casting device;

FIG. 5 an exemplary embodiment of a continuous casting device;

FIG. 6 an exemplary embodiment of a casting device with multiple mold cavities;

FIG. 7 a first exemplary embodiment of a cross-section of a flow connection element or gate;

FIG. 8 a second exemplary embodiment of a cross-section of a flow connection element or gate;

FIG. 9 a third exemplary embodiment of a cross-section of a flow connection element or gate;

FIG. 10 a fourth exemplary embodiment of a cross-section of a flow connection element or gate;

FIG. 11 a fifth exemplary embodiment of a cross-section of a flow connection element or gate;

FIG. 12 an exemplary embodiment of electrodes arranged one after the other;

FIG. 13 an exemplary embodiment of circumferential electrodes arranged one after the other;

FIG. 14 a further exemplary embodiment of a casting device in the form of a low pressure ingot mold device or counter pressure ingot mold device.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a schematic representation of a first exemplary embodiment of a casting device 1. The casting device 1 in this exemplary embodiment is formed as a low pressure ingot mold casting device or as a counter pressure ingot mold casting device.

The casting device 1 comprises a furnace 2 in which a receiving space 3 for receiving melt 4 is formed. In particular, it can be provided that crucibles 5 are arranged in the furnace 2, in which crucibles 5 the melt 4 is received. The crucible 5 can be formed of a ceramic material, which exhibits a high temperature resistance. The furnace 2 can serve, in particular, for keeping the melt 4 at a high temperature level, so that it remains in a molten state.

Moreover, a platen 6 is formed, which forms an upper delimitation of the furnace 2. The platen 6 can be formed either as a distinct component or as an integral component of the furnace 2. Above the platen 6, a mold 7 is arranged which has a lower mold part 8 and an upper mold part 9. The two mold parts 8, 9 form a mold cavity 10, which serves for receiving the melt 4 and for shaping the cast workpiece.

The mold 7 can, for example, be formed in the form of an ingot mold, which is suitable for casting multiple thousand workpieces.

As an alternative to this, it is also conceivable that the mold 7 is formed as an expendable mold, for example made from a sand material, and therefore serves only for casting a single workpiece.

Moreover, a flow connection element 11 is formed, which serves for directing the melt 4 from the crucible 5 into the mold cavity 10. In the present exemplary embodiment, the flow connection element 11 is formed as a riser tube 12, which protrudes into the receiving space 3 of the furnace 2 and penetrates the platen 6. The lower mold part 8 can directly follow the riser tube 12 and have a gate 13 into which the riser tube 12 opens. Additionally, a very simplified representation shows a supporting structure 14 which can be coupled with the upper mold part 9 and can serve for moving the upper mold part 9 relative to the lower mold part 8.

The furnace 2 further has a compressed air supply opening 15 through which compressed air can be introduced into the receiving space 3 of the furnace 2. By pressurizing the receiving space 3 of the furnace 2 with compressed air, the melt 4 in the riser tube 12 is pressed into the mold cavity 10.

The surface of the electrodes 20, 21 can be integrated into the inner jacket surface 19 of the flow connection element 11 or of the gate 13. Thus, the electrodes 20, 21 can lie flush with the inner jacket surface 19 of the flow connection element 11 or of the gate 13.

In a further embodiment variant, it can also be provided that the electrodes 20, 21 are placed on the inner jacket surface 19 of the flow connection element 11 or of the gate 13. In such an exemplary embodiment, the electrodes 20, 21 protrude inwardly with respect to the inner jacket surface 19 of the flow connection element 11 or of the gate 13.

Moreover, a magnetic element 16 is formed which, in the present exemplary embodiment, is arranged in the region of the flow connection element 11. The magnetic element 16 in the present exemplary embodiment is formed as an electromagnet 17 which has a coil 18. Here, the coil 18 is formed such that the flow cross-section of the flow connection element 11 is enclosed annularly by the coil 18. In particular, it can be provided here, as it can be seen in FIG. 1, that the coil 18 is arranged within the furnace 2 and surrounds the riser tube 12. As an alternative to this, it can also be provided that the coil 18 is integrated into the riser tube 12. Of course, a permanent magnet can also be provided instead of the coil 18.

In the sectional view I-I, it can be seen that, in the region of the magnetic element 16, a first electrode 20 and a second electrode 21 are arranged on an inner jacket surface 19 of the riser tube 12, which electrodes are formed to subject the melt 4 being transported in the riser tube 12 to current. By means of the magnetic element 16, a magnetic force 22 can be exerted onto the magnetic element 4 being led in the flow connection element 11. Here, the magnetic force 22 can act in a conveying direction 23 or also against the conveying direction 23.

In particular, it is conceivable that the magnetic force 22 acts as a conveyance support for conveying the melt 4 from the crucible 5 into the mold cavity 10.

FIG. 2 shows another exemplary embodiment of a low pressure ingot mold casting device and/or counter pressure ingot mold casting device.

FIG. 2 shows a further and possibly independent embodiment of the low pressure ingot mold casting device and/or counter pressure ingot mold casting device, wherein again, equal reference numbers and/or component designations are used for equal parts as before in FIG. 1. In order to avoid unnecessary repetitions, it is pointed to/reference is made to the detailed description in FIG. 1 preceding it.

As it can be seen in FIG. 2, it can be provided that the magnetic element 16 is integrated into the platen 6 and surrounds the riser tube 12 in this region.

FIG. 3 shows a further and possibly independent embodiment of the casting device 1, wherein again, equal reference numbers and/or component designations are used for equal parts as before in FIGS. 1 and 2. In order to avoid unnecessary repetitions, it is pointed to/reference is made to the detailed description in FIGS. 1 and 2 preceding it.

As it can be seen in FIG. 3, it can be provided that the casting device 1 is formed as a device for gravity casting, wherein, in the present exemplary embodiment, the mold 7 is formed as an expendable mold of sand. Here, the mold cavity 10 is flow-connected with a runner 24 via the gate 13, into which runner 24 a sprue 25 opens. Here, the melt 4 is poured into the sprue 25 by means of the crucible 5, and reaches the mold cavity 10 via the runner 24 and the gate 13. Here, feeders 26 serve for de-aerating the mold cavity 11 and/or as a reservoir during the solidification of the melt.

The magnetic element 16 and/or the electrodes 20, 21 can be integrated directly into the mold 7 in such an exemplary embodiment. It is conceivable, for instance, that the magnetic element 16 and the electrodes 20, 21 are arranged in the region of the runner 24. As it can also be seen in FIG. 3, it can be provided that the magnetic element 16 and the electrodes 20, 21 are arranged in the region of the gate 13.

The arrangement described above of the magnetic element 16 and/or the electrodes 20, 21 can be seen as an alternative variant. Moreover, it is also conceivable that a magnetic element 16 and electrodes 20, 21 are arranged both in the region of the runner 24 and in the region of the gate 13.

In the present exemplary embodiment, it can be provided that the magnetic element 16 and/or the electrodes 20, 21 are embedded into the sand of the mold 7, such that they can be removed from the mold 7 upon destruction of the same and can be made available for use in further molds 7.

FIG. 4 shows a further exemplary embodiment of gravity casting device, wherein, in this exemplary embodiment, the mold 7 and the flow connection element 11, in particular the runner 24, are formed as separate components. Here, the magnetic element 16 and/or the electrodes 20, 21 can be arranged in the region of the runner 24. In such an exemplary embodiment, one and the same runner 24 can be used for different molds 7, wherein the magnetic element 16 and/or the electrodes 20, 21 do not have to be separately integrated into each mold 7.

FIG. 5 shows a further and possibly independent embodiment of the casting device 1, wherein again, equal reference numbers and/or component designations are used for equal parts as before in FIGS. 1 to 4. In order to avoid unnecessary repetitions, it is pointed to/reference is made to the detailed description in FIGS. 1 through 4 preceding it.

In this exemplary embodiment, the casting device 1 has multiple mold cavities 10. Here, the individual mold cavities 10 are each flow-connected with the runner 24 via the gate 13. Here, it can be provided that, in the region of each of the gates 13, a magnetic element 16 and/or an electrode 20, 21 is arranged.

The filling of each of the mold cavities 10 can be controlled individually by means of the individual magnetic elements 16 and/or the electrodes 20, 21.

FIG. 6 shows a further and possibly independent embodiment of the casting device 1, wherein again, equal reference numbers and/or component designations are used for equal parts as before in FIGS. 1 to 5. In order to avoid unnecessary repetitions, it is pointed to/reference is made to the detailed description in FIGS. 1 through 5 preceding it.

In this exemplary embodiment of the FIG. 6, the casting device 1 is formed as a continuous casting device. Here, the melt 4 is directed into the mold 7, which is formed as an ingot mold, via the flow connection element 11, which, in this case, is formed as a casting tube. The melt 4 solidifies in the mold 7 at least in an edge region and thus, can be directed through the mold 7 in a continuous manner. As it can be seen in FIG. 6, it can be provided that the magnetic element 16 and/or the electrodes 20, 21 are integrated into the mold 7, in particular into the ingot mold. Moreover, it is also conceivable, as an alternative or an addition, that the magnetic element 16 and the electrodes 20, 21 are integrated into the flow connection element 11 and/or are arranged in the region of the flow connection element 11.

In FIGS. 7 to 11, different exemplary embodiments of cross-sections of flow connection elements 11 and/or of arrangements of the magnetic elements 16 and the electrodes 20, 21 are shown, wherein again, equal reference numbers and/or component designations are used for equal parts as in the respective preceding figures. Each of these exemplary embodiments of a possible flow cross-section is applicable to each of the exemplary embodiments of casting devices 1 as described in FIGS. 1 to 6.

In the exemplary embodiment according to FIG. 7, the flow connection element 11 has a rectangular cross-section, wherein the electrodes 20, 21 are arranged on two opposing sides. On each of the two other opposing sides of the flow connection element 11, a magnetic element 16 is arranged offset to the aforementioned by 90°. Here, the cross-section of the flow connection element 11 is not surrounded by the magnetic element 16.

FIG. 8 shows a further exemplary embodiment of the cross-section of the flow connection element 11. As it can be seen in FIG. 8, it can be provided that the flow connection element 11 has a rectangular cross-section and the electrodes 20, 21 are arranged on opposing sides of said cross-section. Here, the flow connection element 11 can be enclosed by the magnetic element 16. Here, the magnetic element 16 can have an annular cross-section.

In a further exemplary embodiment not depicted, it is also conceivable, analogously to FIG. 8, that the magnetic element 16 does not have an annular cross-section but rather a rectangular cross-section that is adapted to the flow connection element 11.

In the exemplary embodiment according to FIG. 9, both the flow connection element 11 and the magnetic element 16 have a circular cross-section. Here, the magnetic element 16 is arranged so as to surround the flow connection element 11. In this exemplary embodiment, the two electrodes 20, 21 are arranged diametrically opposed on the inner jacket surface 19 of the flow connection element 11.

In the further exemplary embodiment according to FIG. 10, the flow connection element 11 is formed in the form of a channel which has no closed cross-section. Here, the magnetic element 16 can also be formed to surround the flow connection element 11.

In a further exemplary embodiment according to FIG. 11, the flow connection element 11 is also formed as a channel as the magnetic element 16 does not surround the flow connection element 11, but rather, analogously to FIG. 7, two magnetic elements 16 positioned opposite one another are formed.

In a further exemplary embodiment according to FIG. 12, the electrodes 20, 21 in the flow connection element 11 are not arranged opposite each other but rather are arranged one after the other when viewed in the conveying direction 23. Here, it can be provided that the electrodes 20, 21 are arranged on one side of the flow connection element 11.

FIG. 13 shows a further exemplary embodiment of the arrangement of the electrodes 20, 21, wherein, in this exemplary embodiment, the electrodes 20, 21 are, analogously to FIG. 12, also arranged one after the other and/or spaced from one another when viewed in the conveying direction 23. In this exemplary embodiment, the electrodes 20, 21 are respectively formed, for example, in the form of circumferential or at least partly circumferential electrode rings.

In a further exemplary embodiment not depicted, it is also conceivable that the electrodes 20, 21 are formed, for example in the form of rods, for example made from carbon, which rods are stuck through the flow cross-section. Electrodes formed in such a way can also, for example, be formed to be axially spaced from one another.

In particular, it can be provided that the electrodes 20, 21 and the electromagnet 17 are subjected to alternating current, wherein the alternating current applied to the electrodes 20, 21 and the alternating current applied to the electromagnet 17 are phase-shifted relative to one another or can be actively phase-shifted such that a magnetic force 22 acts on the melt 4 exclusively in the desired direction.

FIG. 14 shows a further and possibly independent embodiment of the low pressure ingot mold casting device and/or counter pressure ingot mold casting device, wherein again, equal reference numbers and/or component designations are used for equal parts as before in FIG. 1. In order to avoid unnecessary repetitions, it is pointed to/reference is made to the detailed description in FIG. 1 preceding it.

As it can be seen in FIG. 14, it can be provided that the first electrode 20 and the second electrode 21 are shorted with one another by means of a current bridge 27. Such a current bridge may, of course, be applied in any and all of the described embodiments of the electrodes 20, 21.

Of course, all exemplary embodiments described above allow the use of either a coil 18 or also a permanent magnet.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 casting device
2 furnace
3 receiving space
4 melt
5 crucible
6 platen
7 mold
8 lower mold part
9 upper mold part
10 mold cavity
11 flow connection element
12 riser tube
13 gate
14 supporting structure
15 compressed air supply opening
16 magnetic element
17 electromagnet
18 coil
19 inner jacket surface
20 first electrode
21 second electrode
22 magnetic force
23 conveying direction
24 runner
25 sprue
26 feeder
27 current bridge

The invention claimed is:

1. A method for casting a melt of a metallic material by a furnace of a low pressure casting device or counter pressure casting device, which has a receiving space, a riser tube protruding into the receiving space, and first and second electrodes arranged in the riser tube on two opposing sides thereof, the first electrode and the second electrode being shorted with one another by a current bridge, the method comprising: pressurizing the receiving space with compressed air, so that the melt in the riser tube of the furnace is pressed into a mold cavity of a mold, wherein simultaneously, a magnetic field acting against a conveying direction of the melt is applied to the melt of the metallic material by a magnetic element arranged in the region of the riser tube.

2. The method according to claim 1, wherein the magnetic field is generated by an electromagnet.

3. The method according to claim 1, wherein the metallic material comprises aluminum or an aluminum alloy.

4. The method according to claim 1, wherein a magnetic force acts upon the melt against the conveying direction in a flow connection element, wherein a current is induced in the melt by movement of the melt in the flow connection element and by the magnetic force acting on the melt, which current causes a magnetic field in the melt.

5. The method according to claim 1, wherein the current bridge is formed of a material which has a higher electric conductivity than the material of the melt.

6. The method according to claim 1, wherein the first electrode and the second electrode in the riser tube are used to measure an induction voltage occurring in the melt and/or an induction current, wherein, based on the measured induction voltage and/or induction current, a flow speed of the melt is calculated.

7. The method according to claim 1, wherein the magnetic field in the magnetic element and/or currents in the first electrode and the second electrode is/are applied in a pulsed manner.

8. The method according to claim 7, wherein at least one capacitor is provided for application, in a pulsed manner, of the magnetic field in the magnetic element and/or of the currents in the first electrode and the second electrode.

9. A casting device for low-pressure or counter-pressure casting of a melt of a metallic material, the casting device comprising:
a furnace for receiving the melt, the furnace including:
an inlet through which compressed air is introduced into the furnace to pressurize the furnace, and
a riser tube for transferring the melt into a mold cavity of a mold;
first and second electrodes arranged in the riser tube on two opposing sides thereof, the first and second electrodes being shorted with one another by a current bridge; and
a magnetic element arranged in the region of the riser tube to apply a magnetic field to the melt against a conveying direction of the melt.

10. The casting device according to claim 9, wherein the magnetic element is formed as an electromagnet, which has a coil that, at least in some regions, surrounds the riser tube.

11. The casting device according to claim 9, wherein multiple mold cavities are formed in the mold, which mold cavities are each coupled with a runner via a gate, wherein a magnetic element is arranged in one or multiple ones of the gates.

12. The casting device according to claim 9, wherein the riser tube has a rectangular cross-section, and wherein the first electrode and the second electrode are arranged in two opposing sides of the cross-section.

13. The casting device according to claim 9, wherein the furnace has at least two riser tubes for transferring the melt into the mold cavity.

14. The casting device according to claim 9, wherein the furnace further includes a second riser tube for transferring the melt into a second mold cavity of a second mold.

15. The casting device according to claim 9, wherein the current bridge is formed of a material which has a higher electric conductivity than the material of the melt.

16. A method for casting a melt of a metallic material by a furnace of a low pressure casting device or counter pressure casting device, which has a receiving space, a riser tube protruding into the receiving space, and first and second electrodes arranged in the riser tube on two opposing sides thereof, the method comprising:
pressurizing the receiving space with compressed air, so that the melt in the riser tube of the furnace is pressed into a mold cavity of a mold, and, simultaneously, utilizing a magnetic element arranged in the region of the riser tube to apply a magnetic field to the melt against a conveying direction of the melt;
via the first electrode and the second electrode in the riser tube, measuring an induction voltage occurring in the melt and/or an induction current; and
calculating a flow speed of the melt based on the measured induction voltage and/or induction current.

17. A method for casting a melt of a metallic material by a furnace of a low pressure casting device or counter pressure casting device, which has a receiving space, a riser tube protruding into the receiving space, and first and second electrodes arranged in the riser tube on two opposing sides thereof, the method comprising:
pressurizing the receiving space with compressed air, so that the melt in the riser tube of the furnace is pressed into a mold cavity of a mold, and, simultaneously, utilizing a magnetic element arranged in the region of the riser tube to apply a magnetic field to the melt against a conveying direction of the melt; and
wherein the magnetic field in the magnetic element and/or a current in the first and second electrodes is/are applied in a pulsed manner.

18. A casting device for low-pressure or counter-pressure casting of a melt of a metallic material, the casting device comprising:
a furnace for receiving the melt, the furnace including:
an inlet through which compressed air is introduced into the furnace to pressurize the furnace, and
a riser tube for transferring the melt into a mold cavity of a mold;
first and second electrodes arranged in the riser tube on two opposing sides thereof;
a magnetic element arranged in the region of the riser tube to apply a magnetic field to the melt against a conveying direction of the melt; and
a capacitor coupled to the magnetic element or to the first and second electrodes configured for applying, in a pulsed manner, the magnetic field in the magnetic element and/or a current in the first and second electrodes.

19. The casting device according to claim 18, wherein the magnetic element is formed as an electromagnet including a coil that surrounds at least a portion of the riser tube.

20. The casting device according to claim 18, wherein the riser tube has a rectangular cross-section, and wherein the first electrode and the second electrode are arranged in two opposing sides of the cross-section.

\* \* \* \* \*